June 7, 1932. R. S. SANFORD 1,862,280

AEROPLANE

Filed July 23, 1926

INVENTOR
ROY S. SANFORD
BY
M. W. McConkey
ATTORNEY

Patented June 7, 1932

1,862,280

UNITED STATES PATENT OFFICE

ROY S. SANFORD, OF SOUTH BEND, INDIANA, ASSIGNOR TO BENDIX BRAKE COMPANY, OF CHICAGO, ILLINOIS, A CORPORATION OF ILLINOIS

AEROPLANE

Application filed July 23, 1926. Serial No. 124,309.

This invention relates to steering and braking aeroplanes and other vehicles, and is illustrated as embodied in an aeroplane having rudder-controlling steering connections operated by rotation of a pilot-operated shaft and braking connections operated by rocking the shaft.

An object of the invention is to provide a single control for the steering and braking. Preferably the pilot-operated shaft, or an equivalent operating member, is also arranged to operate the brakes selectively, thus giving increased steering control when on the ground, and I consider it desirable to arrange it in such a manner that the steering is not affected by rocking it to apply the brakes.

In one desirable arrangement the shaft, operated by a rudder-bar or the like, is carried by a pivotally mounted bearing, and has two pairs of oppositely-extending arms, one pair being connected to the steering means substantially in the axis about which the bearing pivots, while the other pair is connected to the braking means outside of that axis.

Figure 1:
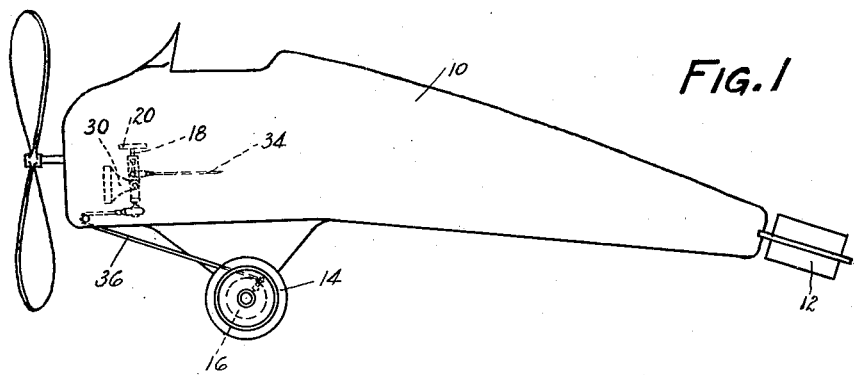
Figure 2:
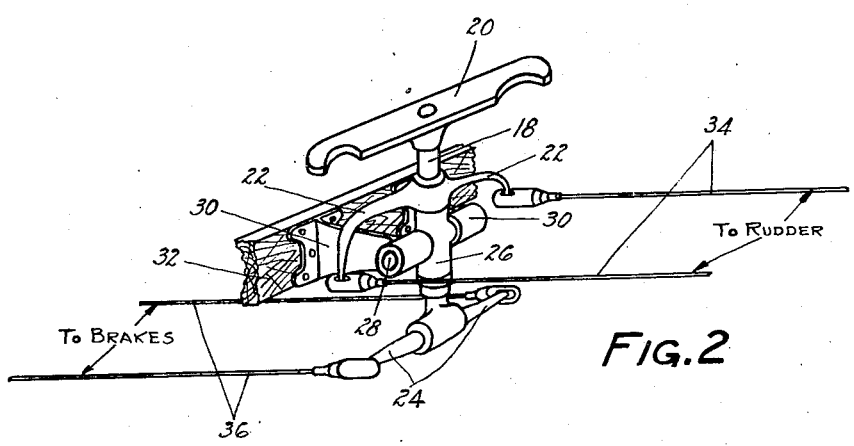

The above and other objects and features of the invention, including various novel combinations of parts and desirable particular constructions, will be apparent from the following description of one illustrative embodiment shown in the accompanying drawing, in which:

Figure 1 is a diagrammatic side elevation of an aeroplane embodying the novel steering and braking mechanism; and Figure 2 is a perspective of the pilot-controlled shaft and its connections.

The invention may be embodied in an aeroplane 10 of any desired type, having a rudder or other steering device 12 and landing gear including a pair of wheels 14 having brakes 16.

At any desired point is arranged an operating shaft or other controlling member 18, shown with a rudder bar 20 at its upper end to be grasped by the pilot, and as having a pair of oppositely-extending steering arms 22 and a pair of oppositely-extending braking arms 24.

Shaft 18 is journalled in a vertical bearing 26 having horizontal trunnions 28 pivoted in bearings carried by brackets 30 secured to a cross frame member 32. Thus the pivoted bearing 26 permits the shaft to rock about a transverse axis, i. e. an axis crosswise of the shaft, this being the axis of trunnions 28.

Arms 22 are universally jointed to cables or other steering connections 34, leading to the rudder or other steering device 12, substantially in the axis of trunnions 28, so that the steering is not affected by the rocking of the shaft. Arms 24 are universally jointed to cables or other connections 36, leading to brakes 16, some distance below the axis of trunnions 28.

It will be seen that rotation of shaft 18 operates the steering means, and also selectively operates brakes 16, thus aiding the steering when on the ground. On the other hand, rocking shaft 18 operates both brakes 16 to retard movement of the aeroplane when on the ground, without substantially affecting the steering.

While one illustrative embodiment has been described in detail, it is not my intention to limit the scope of the invention to that particular embodiment, or otherwise than by the terms of the appended claims.

I claim:

1. An aeroplane having, in combination, rudder-controlling connections, a pair of brake-controlling connections, and a single pilot-controlled operating member arranged to have one movement for steering movement of the rudder-controlling connections and for selective operation of the brake-controlling connections to steer when on the ground, and also arranged to have a different movement for simultaneous operation of the brake-controlling connections to retard the motion of the aeroplane on the ground.

2. Steering and braking mechanism comprising, in combination, steering connections, two braking connections, and an operating member movable about one axis to operate the steering connections and selectively to operate one or the other of the two braking connections and movable about a different axis to operate both braking connections.

3. Steering and braking mechanism comprising, in combination, a rotatable steering member rockable about a transverse axis, steering means connected to the steering member substantially in the transverse axis to be operated by rotation of said member, but unaffected by rocking of said member, and braking connections operated by rocking the rotatable member about said transverse axis.

4. Steering and braking mechanism comprising, in combination, a rotatable steering member rockable about a transverse axis, steering means connected to the steering member substantially in the transverse axis to be operated by rotation of said member, but unaffected by rocking of said member, and two braking connections operated together by rocking the rotatable member about said transverse axis and operated selectively by rotation of said member.

5. Steering and braking mechanism comprising, in combination, an operating shaft, a bearing for said shaft pivotally mounted for movement about an axis crosswise of the shaft, two pairs of oppositely-extending arms on the shaft, steering means connected to one pair of arms substantially in the crosswise axis, and braking means connected to the other pair of arms outside said crosswise axis.

6. Steering and braking mechanism comprising, in combination, an operating shaft, a bearing for said shaft pivotally mounted for movement about an axis crosswise of the shaft, two pairs of oppositely-extending arms on the shaft, steering means connected to one pair of arms, and braking means connected to the other pair of arms.

7. A control member comprising a vertically-extending bearing pivoted for movement about a substantially horizontal axis, a vertical shaft journaled in said bearing, a transverse operating member mounted on one end of the shaft and operable either to turn the shaft in the bearing or to rock the shaft and bearing about said horizontal axis, operated means acted on by the shaft when turned in the bearing and terminating substantially at said horizontal axis and therefore substantially unaffected by the rocking of the shaft in the bearing, and other operated means also acted on by the turning of the shaft in the bearing and additionally acted on by the rocking of the shaft and the bearing.

8. A control member comprising a vertically-extending bearing pivoted for movement about a substantially horizontal axis, a vertical shaft journaled in said bearing, means adjacent one end of the shaft and operable either to turn the shaft in the bearing or to rock the shaft and bearing about said horizontal axis, operated means acted on by the shaft when turned in the bearing and terminating substantially at said horizontal axis and therefore substantially unaffected by the rocking of the shaft in the bearing, and other operated means also acted on by the turning of the shaft in the bearing and additionally acted on by the rocking of the shaft and the bearing.

9. A control member comprising a vertically-extending bearing pivoted for movement about a substantially horizontal axis, a vertical shaft journaled in said bearing, means adjacent one end of the shaft and operable either to turn the shaft in the bearing or to rock the shaft and bearing about said horizontal axis, operated mean acted on by the shaft when turned in the bearing and terminating substantially at said horizontal axis and therefore substantially unaffected by the rocking of the shaft in the bearing, and other operated means acted on by the rocking of the shaft and the bearing.

In testimony whereof, I have hereunto signed my name.

ROY S. SANFORD.